US008694011B2

(12) United States Patent
Jalil et al.

(10) Patent No.: US 8,694,011 B2
(45) Date of Patent: Apr. 8, 2014

(54) METHOD AND SYSTEM FOR SPECTRUM REUSE IN THE UPLINK IN A WIRELESS COMMUNICATION NETWORK

(75) Inventors: Rehan Jalil, San Jose, CA (US); Mustafa Ergen, Oakland, CA (US); Tony Mak, St. San Francisco, CA (US)

(73) Assignee: WiChorus Inc., Santa Clara, CA (US)

( * ) Notice: Subject to any disclaimer, the term of this patent is extended or adjusted under 35 U.S.C. 154(b) by 1379 days.

(21) Appl. No.: 11/951,343

(22) Filed: Dec. 6, 2007

(65) Prior Publication Data

US 2008/0139211 A1 Jun. 12, 2008

Related U.S. Application Data

(60) Provisional application No. 60/873,833, filed on Dec. 7, 2006.

(51) Int. Cl.
*H04W 40/00* (2009.01)
(52) U.S. Cl.
USPC .................. 455/448; 455/447; 455/452.2
(58) Field of Classification Search
USPC ............. 455/447, 452.2, 562.1; 370/335, 474
See application file for complete search history.

(56) References Cited

U.S. PATENT DOCUMENTS

| | | | | |
|---|---|---|---|---|
| 4,144,411 A | * | 3/1979 | Frenkiel | 455/447 |
| 5,038,399 A | * | 8/1991 | Bruckert | 455/447 |
| 5,579,373 A | * | 11/1996 | Jang | 455/436 |
| 6,553,234 B1 | | 4/2003 | Florea | |
| 7,200,407 B1 | | 4/2007 | Smith et al. | |
| 7,515,939 B2 | | 4/2009 | Catreux-Erceg et al. | |
| 2005/0074030 A1 | * | 4/2005 | Cho et al. | 370/474 |
| 2005/0174965 A1 | * | 8/2005 | Sarkkinen et al. | 370/329 |
| 2006/0041918 A9 | * | 2/2006 | Currivan et al. | 725/111 |
| 2006/0182067 A1 | | 8/2006 | Rinne et al. | |
| 2006/0212133 A1 | * | 9/2006 | Damnjanovic et al. | 700/1 |
| 2007/0077934 A1 | | 4/2007 | Chindapol et al. | |

* cited by examiner

*Primary Examiner* — Kashif Siddiqui
(74) *Attorney, Agent, or Firm* — Hamilton, Brook, Smith & Reynolds, P.C.

(57) ABSTRACT

A method of managing communication in the wireless communication network having a plurality of Base Stations (BSs) is provided. Each BS provides communication to one or more Mobile Stations (MSs) in an associated cell. The method includes re-using at a BS, channel allocated to collocated BSs to communicate with MSs located in a first predetermined region in a cell of the BS. The method further includes scheduling MSs located in the first predetermined region based on the position of each MS relative to the BS. The MSs are scheduled using one or more of channels allocated to the collocated BSs and a native channel of the BS. Further, the method includes scheduling MSs located in a second predetermined region based on the position of each MS relative to the BS. The MSs in the second predetermined region are scheduled using the native channel of the BS.

30 Claims, 11 Drawing Sheets

METHOD AND SYSTEM FOR SPECTRUM REUSE IN THE UPLINK IN A WIRELESS COMMUNICATION NETWORK

RELATED APPLICATIONS

Benefit is claimed under 35 U.S.C. 119(e) to U.S. Provisional Application Ser. 60/873,833, entitled "Adaptive method to minimize interference for spectrum reuse in the uplink by distance based scheduling for OFDMA based systems" by Mustafa Ergen et al., filed on Dec. 7, 2006 which is herein incorporated in its entirety by reference for all purposes.

FIELD OF THE INVENTION

The invention generally relates to wireless communication networks. More specifically the invention relates to methods and systems for managing communication in a wireless communication network.

BACKGROUND OF THE INVENTION

In a wireless communication network, a service area includes a plurality of Base Stations (BSs), which can use a predefined channel. Each BS has a cell (coverage area) in which it serves the Mobile Stations (MSs) associated with it. In order to ensure that each point in the service area is completely covered, a BS is located in such a way that its cell (coverage area) partially overlaps with cells of collocated BSs. However, due to overlapping of collocated cells, each BS cannot be operated at the predefined channel, as this will result in interference to MSs in the coverage areas of collocated BS. To provide interference-free service to MSs, collocated BSs are operated at different (orthogonal) channels. Therefore, each BS operates at only a part of the predefined channel. The part of the predefined channel that a BS operates on is called the native channel of the BS. This could result in under-utilization of the complete predefined channel for a service area which a BS can support.

In order to improve utilization of the predefined channel in the service area, a BS may re-use channels allotted to collocated BSs in addition to its native channel. However, this may lead to interference in the coverage areas of the collocated BSs, to which the channels that are re-used correspond to.

There is therefore a need for a method to minimize interference for spectrum re-use in a wireless communication network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
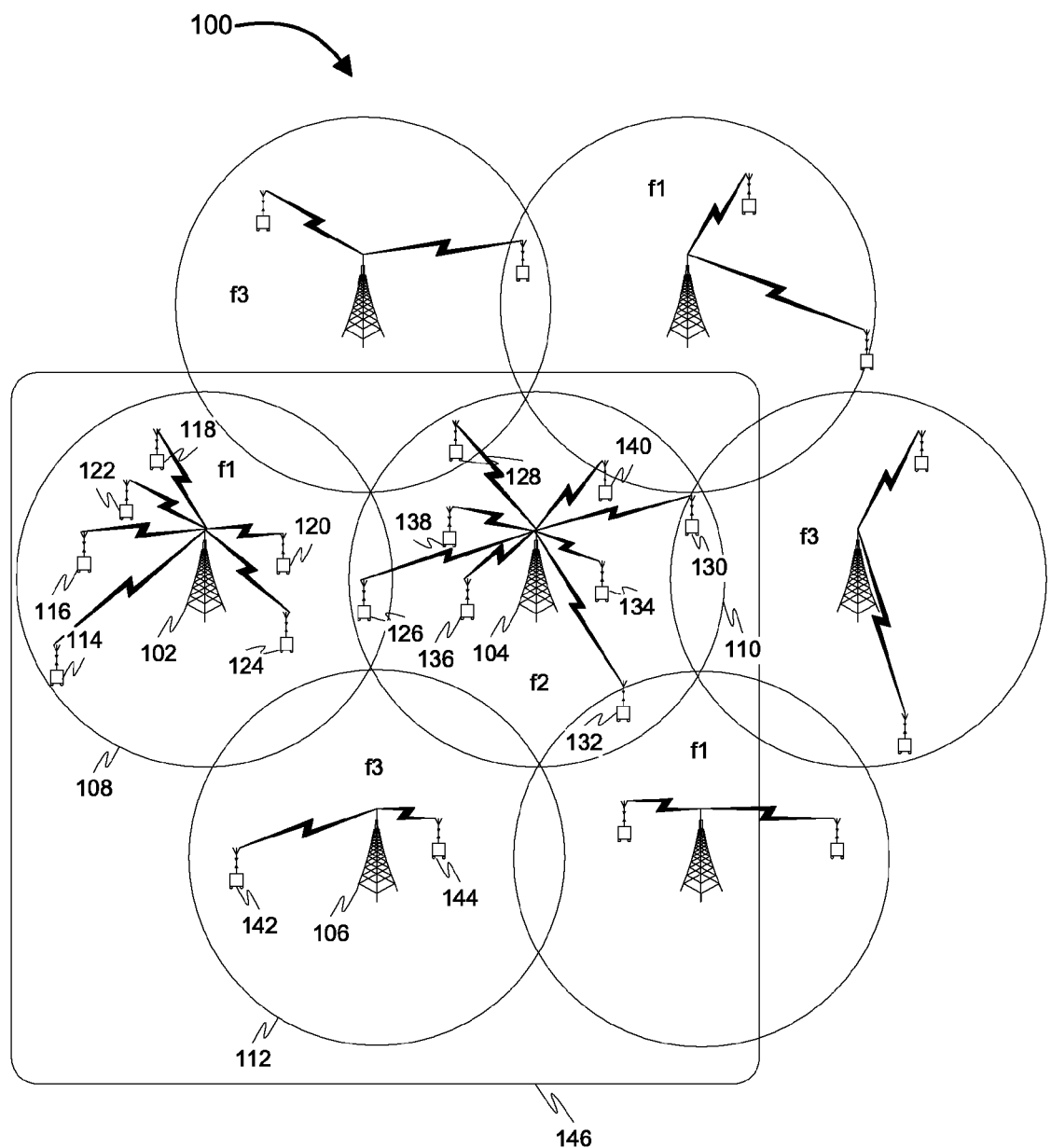
FIG. 1 illustrates a wireless communication network (that is exemplary) in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail, embodiments that are in accordance with the present invention, it should be observed that the embodiments reside primarily in combinations of method steps and apparatus components for managing communication in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of method steps and apparatus components for managing communication in a wireless communication network. The non-transaction-client circuits may include, but are not limited to, a radio receiver, a radio transmitter, signal drivers, clock circuits, power source circuits, and user input devices. As such, these functions may be interpreted as method steps and apparatus components for managing communication in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments provide methods and systems for managing communication in a wireless communication network. Examples of the wireless communication network may include, but are not limited to Worldwide Interoperability for Microwave Access (WiMax), Third Generation Partnership Project—Long Term Evolution (3GPP LTE), Third Generation Partnership Project2—Ultra Mobile Broadband (3GPP2 UMB), and any Orthogonal Frequency Division Multiple Access (OFDMA) variant system. The wireless communication network includes a plurality of Base Stations (BS). Each base station is assigned a channel to communicate with corresponding Mobile Station (MSs). A BS re-uses channel allocated to collocated BSs to communicate with MSs located in a first predetermined region in a cell of the BS. The BS schedules the associated MSs in the cell based on the position of the associated MSs.

FIG. 1 illustrates a wireless communication network 100 in which various embodiments of the invention may function. Examples of the wireless communication network may include, but are not limited to (WiMax,) 3GPP LTE, 3GPP2 UMB, and any OFDMA variant system. Wireless communication network 100 includes a plurality of BSs, for example, a BS 102, a BS 104, and a BS 106, in a service area (not shown in the figure). A BS in the service area is collocated with one or more BSs in the service area. For example, BS 106 is collocated with BS 102 and BS 104. Therefore, BS 102, BS 104, and BS 106 are collocated BSs. A BS serves associated MSs located in the coverage area of the BS. Henceforth, this coverage area is called a cell of the BS. For example, BS 102 has a cell 108, BS 104 has a cell 110, and BS 106 has a cell 112. BS 102 communicates with a MS 114, a MS 116, a MS 118, a MS 120, a MS 122, and a MS 124. BS 104 communicates with a MS 126, a MS 128, a MS 130, a MS 132, a MS 134, a MS 136, a MS 138, and a MS 140. Similarly, BS 106 communicates with a MS 142 and a MS 144. Examples of a MS may include, but are not limited to a laptop, Personal Digital Assistant (PDA), and a hand-held device. Each MS is capable of receiving communication signals from a BS and transmitting communication signals to a BS.

Cells of collocated BSs are also collocated. For example, for cell 108, cell 110 and cell 112 are collocated cells. Collocated cells overlap with each other to ensure that each point in the service area is completely covered.

A service area is allocated a complete channel which may be used by the plurality of BSs in the service area, for communicating with associated MSs. However, to avoid interference due to overlapping of collocated cells, the complete channel is divided into multiple channels. For example, the complete channel may be divided into a channel f1, a channel f2, and a channel f3. This is further explained in conjunction with FIG. 2a. Thereafter, a channel is allocated to a BS. The channel allocated to a BS is the native channel for the BS. The channel is assigned to a BS such that it is different from the channels allocated to collocated BSs. For example, the channel f1 is the native channel of BS 102, the channel f2 is the native channel of BS 104, and the channel f3 is the native channel of BS 106. Therefore, each BS uses its native channel to serve MSs in the corresponding cell thereby avoiding any interference in the service area. Henceforth, it will be apparent to a person skilled in the art that for the purpose of explanation a part 146 of wireless communication network 100 is considered which is explained in detail in conjunction with FIG. 5.

Alternatively, to avoid interference due to overlapping of collocated cells, a frame corresponding to the complete channel is divided into multiple time symbols. For example, the complete time frame may be divided into a time symbol T1, a time symbol T2, and a time symbol T3. This is further explained in conjunction with FIG. 2b. Thereafter, a time symbol is allocated to a BS. The time symbol allocated to a BS is the native time symbol for the BS. The time symbol is assigned to a BS such that it is different from the time symbols allocated to collocated BSs. For example, the time symbol T1 is the native time symbol of BS 102, the time symbol T2 is the native time symbol of BS 104, and the time symbol T3 is the native time symbol of BS 106. Therefore, each BS uses its native time symbol to serve MSs using the complete channel in the corresponding cell thereby avoiding any interference in the service area.

Figure 2A:
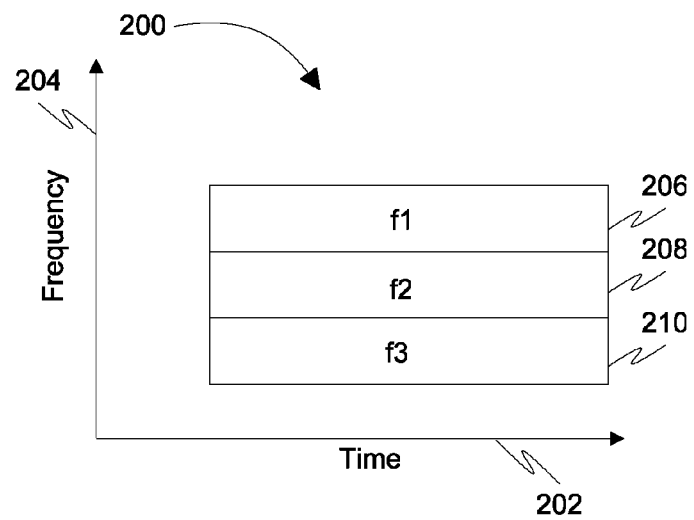
FIG. 2a and 2b illustrates a frame structure of a complete channel allocated to a service area.

FIG. 2a illustrates a frame structure 200 of the complete channel of the service area. An axis 202 represents the time dimension and an axis 204 represents the frequency dimension of frame structure 200. The complete channel of the service area is divided into three segments, i.e., segment 206, segment 208, and segment 210. Segment 206 corresponds to the channel f1, segment 208 corresponds to the channel f2, and segment 210 corresponds to the channel f3. Referring back to FIG. 1, BS 102 communicates with MSs located in cell 108 using segment 206, BS 104 communicates with MSs located in cell 110 using segment 208, and BS 106 communicates with MSs located in cell 112 using segment 210.

Figure 2B:
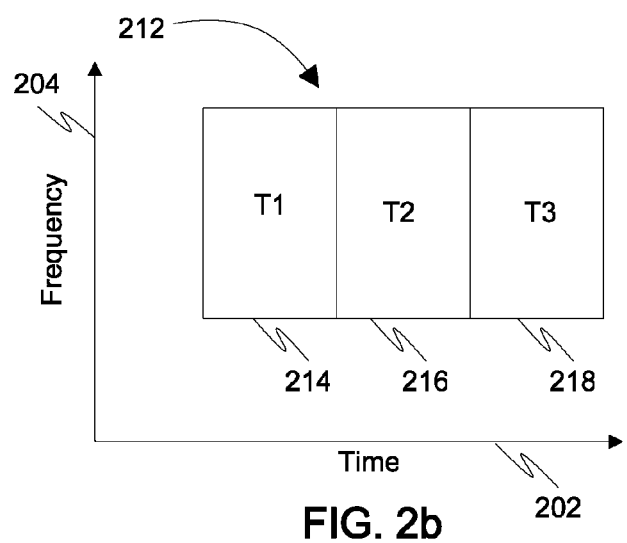

FIG. 2b illustrates a frame structure 212 of the complete channel of the service area. An axis 202 represents the time dimension and an axis 204 represents the frequency dimension of frame structure 212. Frame structure 212 is divided into three segments, i.e., segment 214, segment 216, and segment 218 along axis 202. Segment 214 corresponds to a time symbol T1, segment 216 corresponds to a time symbol T2, and segment 218 corresponds to a time symbol T3. Referring back to FIG. 1, BS 102 communicates with MSs located in cell 108 using segment 214, BS 104 communicates with MSs located in cell 110 using segment 216, and BS 106 communicates with MSs located in cell 112 using segment 218. Henceforth, for the purpose of explanation the frame structure is divided only in respect to frequency dimension. However, it will be apparent to a person skilled in the art that the same method may be applied by dividing the frame structure in time dimension.

Figure 3:
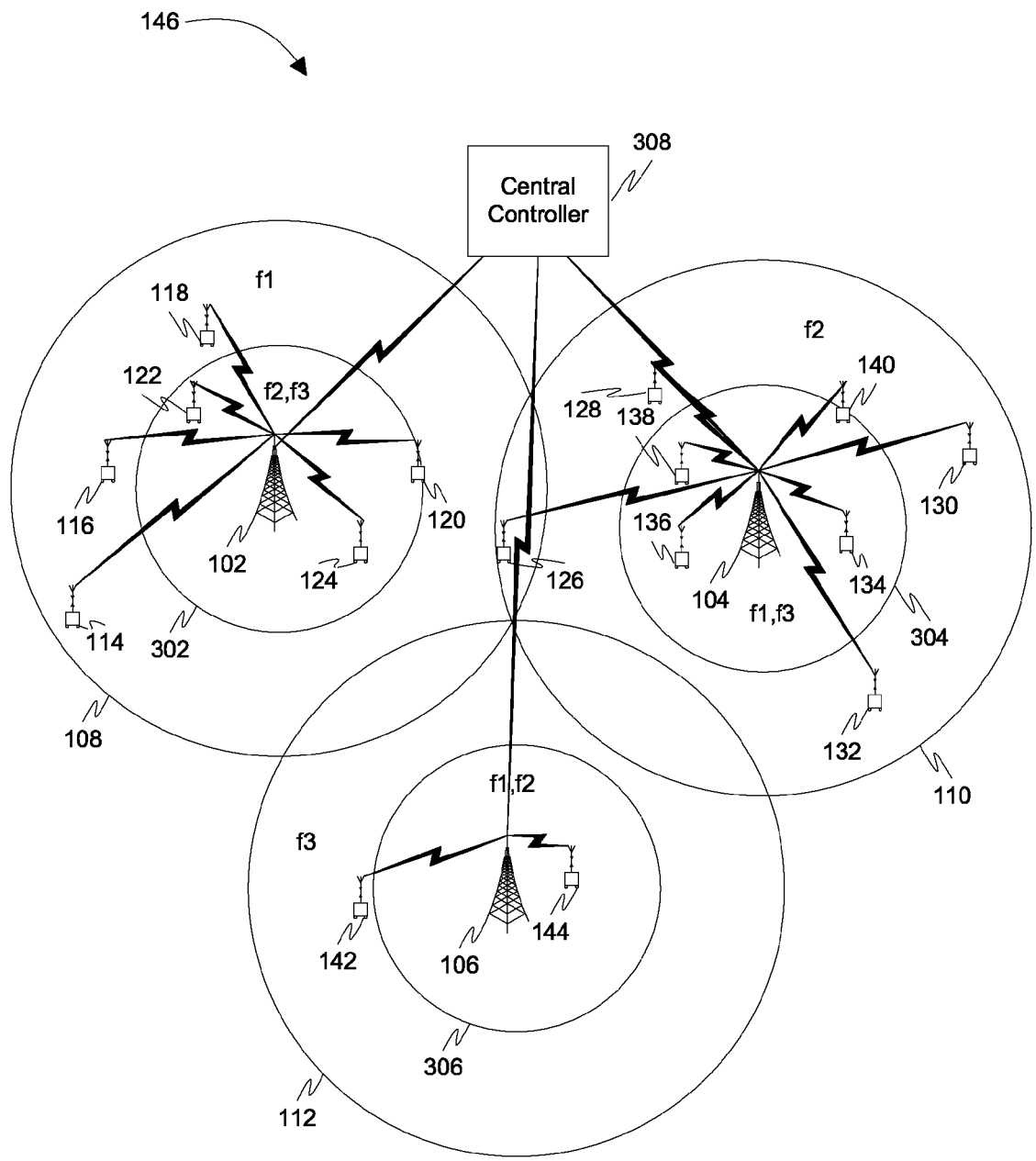
FIG. 3 illustrates an exploded view of a part of the wireless communication network.

FIG. 3 illustrates an exploded view of part 146 of wireless communication network 100. In part 146 of wireless communication network 100, BS 102 communicates with MSs located in cell 108 using channel f1. Similarly, BS 104 uses the channel f2 and BS 106 uses the channel f3. BS 102 may re-use channels allocated to collocated BSs, i.e., the channel f2 and the channel f3, in addition to using its native channel, i.e., the channel f1. However, this may lead to interference in the collocated cells, i.e., cell 110 and cell 112. To avoid this, the power level of the channel f2 and the channel f3 that are re-used must be limited, such that, their coverage area is limited to an inner region of cell 108. Therefore, BS 102 uses the channel f2 and the channel f3 in the inner region of cell 108.

The radius of the inner region of cell 108 is a fraction of the radius of cell 108. The inner region of BS 102 is an inner cell 302 inside cell 108. Similarly, BS 104 re-uses the channel f1 and the channel f3 in an inner cell 304 and BS 106 re-uses the channel f1 and the channel f2 in an inner cell 306. There is a maximum threshold for the radius of each of inner cell 302, inner cell 304, and inner cell 306. This maximum threshold is decided by a central controller 308 that communicated with each of BS 102, BS 104, and BS 106. Central controller may be a part of an Access Service Network Gateway (ASN-GW) (not shown in the FIG. 3) in wireless communication network 100. Central controller 308 may further include a Spectrum Controller (SPC). This is further explained in detail in conjunction with FIG. 4. MSs inside an inner region of a cell of a BS are classified as inner MSs and MSs outside the inner region in the cell of the BS are classified as outer MSs. For example, MS 120, MS 122 and MS 124 are classified as inner MSs of BS 102 and MS 114, MS 116 and MS 118 are classified as outer MS of BS 102. Similarly at BS 104, MS 134, MS 136, MS 138 and MS 140 are classified as inner MSs and MS 126, MS 128, MS 130 and MS 132 are classified as outer MSs. At BS 106, MS 144 is classified as inner MS and MS 142 is classified as outer MS. To enable this classification of MSs, each of BS 102, BS 104, and BS 106 may include a Scheduler/Spectrum agent (SPA).

Here, BS 102 communicates with outer MSs in cell 108 using the channel f1, which is the native channel of BS 102. Further, BS 102 communicates with the inner MSs in cell 108 by re-using the channel f2 and the channel f3. Similarly, BS 104 communicates with outer MSs in cell 110 using the channel f2, which is the native channel of BS 104. BS 104 communicates with inner MSs in cell 110 by re-using the channel f1 and the channel f3. BS 106 communicates with outer MSs in cell 112 using the channel f3, which is the native channel of BS 106. BS 106 communicates with inner MSs in cell 112 using the channel f1 and the channel f2.

It may be noted that, interference may result at an outer MS, induced due to an inner MS of a collocated BS which is using the same frequency as the outer MS Similarly, interference may result at an inner MS, induced due to an outer MS of a collocated BS which is using the same frequency as the inner MS. The invention provides a method to minimize this interference by adopting a position based scheduling which is explained in detail in conjunction with FIG. 6 to FIG. 10.

Figure 4:
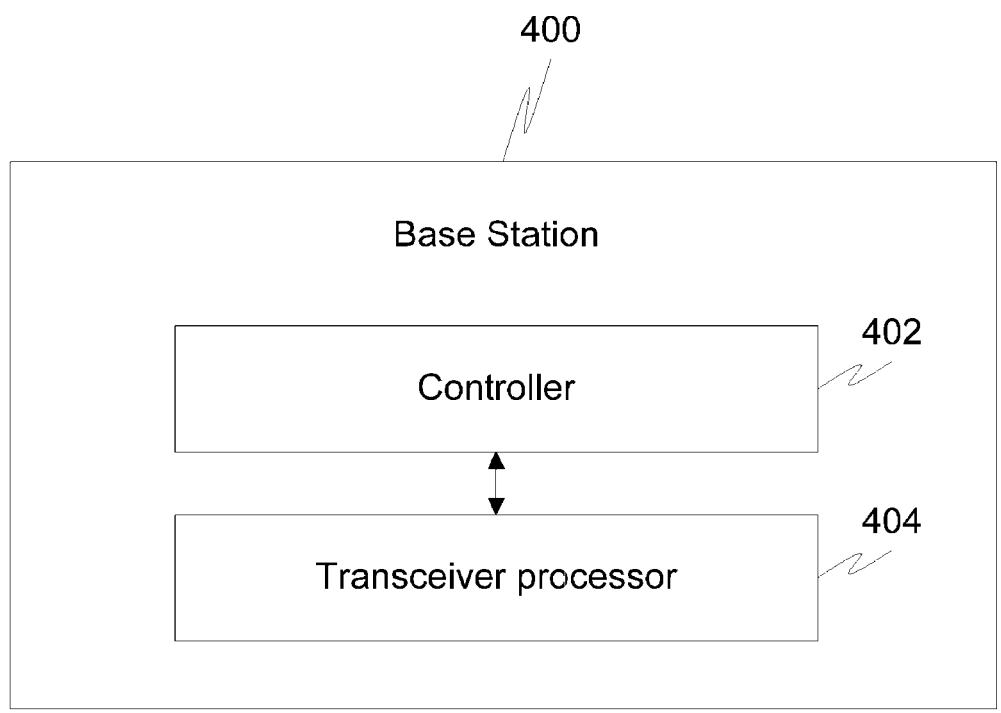
FIG. 4 is a block diagram showing various components of a Base Station (BS), in accordance with an embodiment of the invention.

FIG. 4 is a block diagram showing various components of BS 102 in wireless communication network 100, in accordance with an embodiment of the invention. BS 102 includes a controller 402, and a transceiver processor 404. It will be apparent to people skilled in the art that each of BS 104 and BS 106 includes their own controller and transceiver processor. Controller 402 is configured to re-use at the BS one or more channels allocated to collocated BSs in a first predetermined region in cell 108 of BS 102. In an embodiment, the first predetermined region is the inner region of cell 108. Additionally, controller 402 defines a threshold for the first predetermined region. This will be explained in detail in conjunction with FIG. 6. Thereafter, transceiver processor 404 measures the position of a plurality of MSs associated with BS 102 from the BS in each of the first predetermined region and the second predetermined region in cell 108. Each MS, depending on its position from BS 102 is classified as MS located in the first predetermined region or a MS located in the second predetermined region. In an embodiment, a MS in cell 108 may be classified as inner MS or outer MS based on the position of the MS from BS 108. After distinguishing each MS based on their position from BS 102, transceiver processor 404 schedules the plurality of MSs based on the position of each MS from the BS in each of the first predetermined region and the second predetermined region in cell 108.

Figure 5:
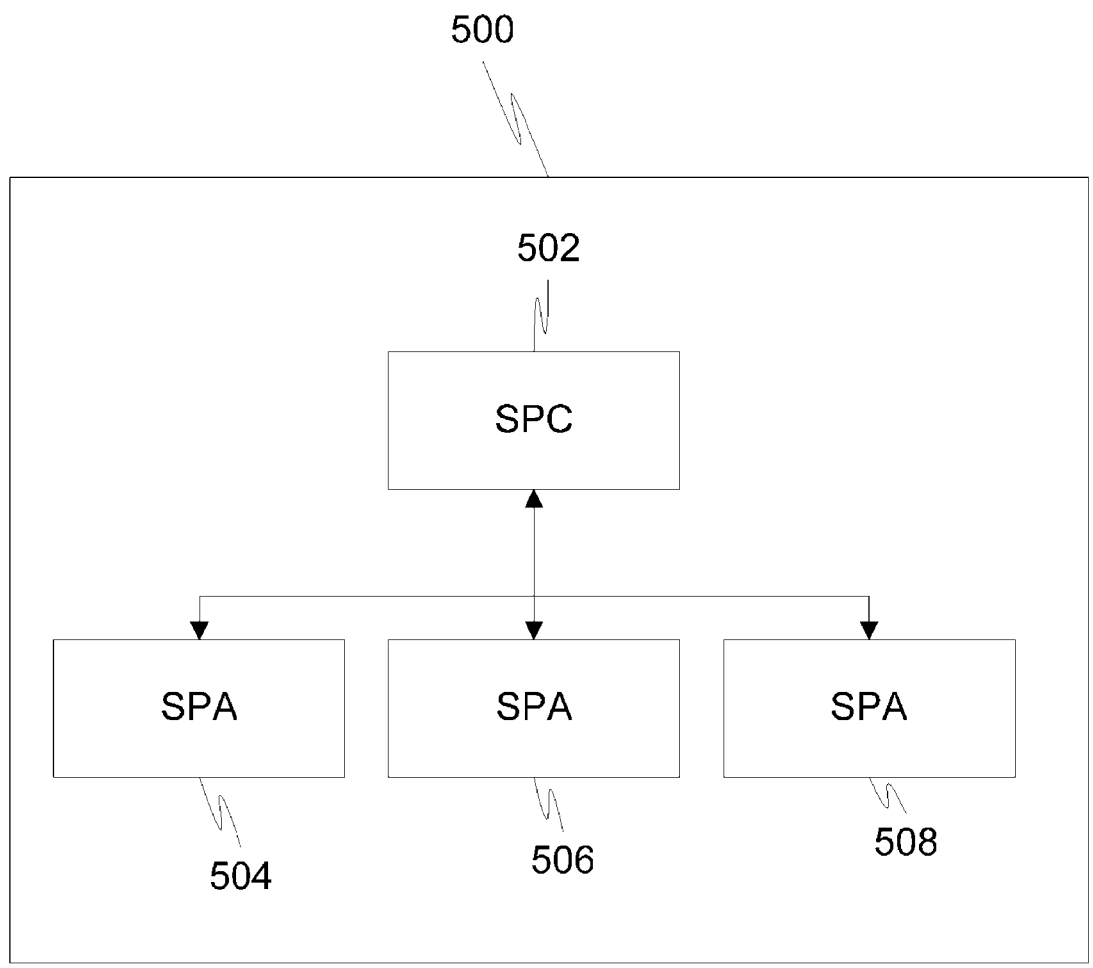
FIG. 5 is a block diagram of a system for managing communication in a wireless communication network, in accordance with an embodiment of invention.

FIG. 5 is a block diagram illustrating a system 500 for managing communication in wireless communication network 100, in accordance with an embodiment of invention. System 500 includes a Spectrum Controller (SPC) 502 and a set of Spectrum Agents (SPAs) (for example, an SPA 504, an SPA 506, and an SPA 508). SPC 502 forms a frame structure for a set of BSs. The set of BSs is a fraction of the plurality of BSs. Therefore, the number of BSs in the set of BSs may be less than or equal to the number of BSs in the plurality of BSs. Each BS in the set of BSs uses the frame structure to communicate with one or more MSs located in an associated cell. The frame structures have been defined in conjunction with FIG. 8 and FIG. 10. SPC 502 may be located in a BS of the set of BSs. For example, the set of BSs include BS 102, BS 104, and BS 106. BS 102 may include the SPC, which creates a frame structure that is used by each of BS 102, BS 104, and BS 106. SPC 502 may be a part of central controller 308. Alternatively, SPC 502 may be located in an ASN-GW of wireless communication network 100.

After SPC 502 forms the frame structure, each SPA in the set of SPAs schedule one or more MSs located in an associated cell of each BS in the set of BSs. An SPA is located a BS in the set of BSs. For example, the set of BSs includes BS 102, BS 104, and BS 106. In this case, BS 102 include SPA 504, BS 104 includes SPA 506, and BS 106 includes SPA 508. The method of scheduling MSs is explained in detail in conjunction with FIG. 6 to FIG. 10.

Figure 6:
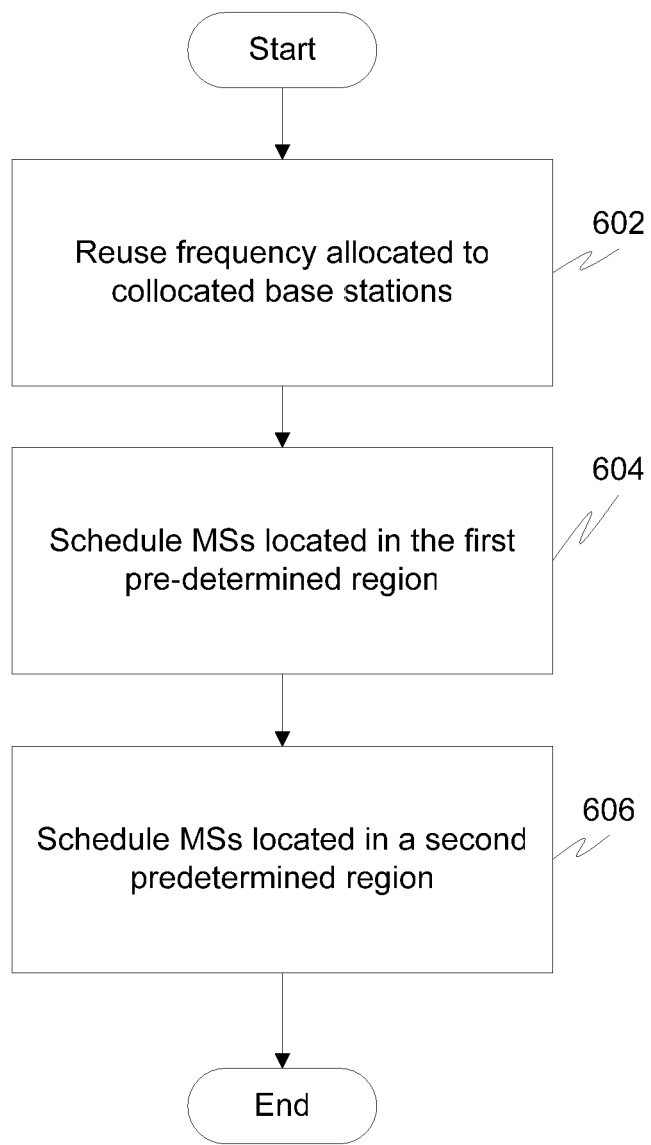
FIG. 6 is a flowchart of a method for managing communication in a wireless communication network, in accordance with an embodiment of the invention.

FIG. 6 is a flowchart of a method for managing communication in wireless communication network 100, in accordance with an embodiment of the invention. At step 602, a BS re-uses channels allocated to collocated BSs to communicate with MSs located in a first predetermined region in a cell of the BS. The first predetermined region may be an inner region of the cell of the BS. The inner region may be an inner cell having a radius which is a fraction of the radius of the cell of the BS. For example, BS 102, re-uses the channel f2 and the channel f3 to communicate with MSs located inside inner cell 302.

At step 604, MSs located in the first predetermined region are scheduled based on the position of each MS relative to the BS in the first predetermined region. The MSs located in the first predetermined region are scheduled using one or more of channels allocated to the collocated BSs and a native channel of the BS. In an embodiment, one or more parts of the channels allocated to collocated BSs may not be re-used. One or more parts of channels of collocated BSs that are not being re-used correspond to a full re-use index. A full re-use index is defined as the percentage of channels of collocated BSs that are not being re-used. For example, at BS 102, MSs located in inner cell 302 are scheduled using a part of the channel f2 and the channel f3. The remaining part of the channels f2 and the channel f3 are left unused. In this case, a full re-use index is the percentage of the channels f2 and the channel f3 that are not being re-used. For example, if the full re-use index is 10 then the first 10% of the channels f2 and the channel f3 are not being re-used. The full re-use method is explained in detail in conjunction with FIG. 5 and FIG. 6.

In an alternative embodiment, one or more parts of the channels allocated to collocated BSs and one or more parts of the native channel of the BS may be used to schedule MSs in the first predetermined region in the cell of the BS. The remaining parts of the channels allocated to collocated BSs are left without re-using. One or more parts of the native channel that are used to schedule MSs in the first predetermined region in the cell of the BS correspond to a partial re-use index. A partial re-use index is the percentage of the native channel that is used to schedule MSs in the first predetermined region in the cell of the BS. The partial re-used index is also applied to channels allocated to collocated BS. For example, at BS 102, MSs located in the inner region are scheduled using one or more parts of each of the channel f1, the channel f2, and the channel f3. The remaining part of the channel f2 and the channel f3 are not being re-used. A partial re-use index is the percentage of the native channel, i.e., the channel f1 that is used to schedule the MSs located in the inner region. The partial re-use index is also to the percentage of the channel f2 and the channel f3 that are used to schedule MSs located in the inner region. For example, if the partial re-use index is 10 then the first 10% of the native channel, i.e., the channel f1 is used to schedule MSs in the inner region. Additionally, the first 10% of the channel f2 and the channel f3 are also used to schedule MSs in the inner region. The partial re-use method is explained in detail in conjunction with FIG. 9 and FIG. 10.

MSs located in the first predetermined region are scheduled based on the distance of each MS from the corresponding BS. MSs located in the first predetermined region are scheduled from nearest to farthest. Alternatively, MSs located in the first predetermined region can be scheduled from farthest to nearest. Additionally, MSs located in the first predetermined region may be scheduled based on the orientation of each MS with respect to the corresponding BS. MSs located in the first predetermined region may be scheduled in clockwise direction. Alternatively, MSs located in the first predetermined region may be scheduled in counter clockwise direction.

At step 606, MSs located in a second predetermined region are scheduled based on the position of each MS relative to the BS. The second predetermined region may be an outer region, which is the region between the boundary of the inner cell of the BS and the cell of the BS. The MSs located in the second predetermined region are scheduled using the native channel of the BS. MSs located in the second predetermined region are scheduled based on the distance of each MS from corresponding BS. MSs located in the second predetermined region may be scheduled from farthest to nearest when MSs located in the first predetermined region are scheduled from nearest to farthest. Alternatively, when MSs located in the first predetermined region are scheduled from farthest to nearest, MSs located in the second predetermined region are scheduled from nearest to farthest. Additionally, MSs located in the second predetermined region are scheduled depending on the orientation of each MS with respect to the corresponding BS. MSs located in the second predetermined region may be scheduled in clockwise direction. Alternatively, MSs located in the second predetermined region are scheduled in counter clockwise direction.

With reference to FIG. 3, in the full re-use method, at BS 102, MSs located in the second predetermined region are scheduled using the native channel, i.e., the channel f1. In the partial re-use method, at BS 102, MSs located in the second predetermined region are scheduled using a part of the native channel, i.e., the channel f1 that is not used to schedule the MSs located in the first predetermined region at step 604.

As an example of the method given above, referring back to FIG. 3, at BS 102, amongst the outer MSs, MS 114 is the farthest from BS 102 and MS 116 and MS 118 are at the same distance from BS 102. Amongst the inner MSs, MS 120 is the farthest from the BS 102, and MS 122 and MS 124 are at same distance from BS 102. Similarly, at BS 104, amongst the outer MSs, MS 126 is the farthest MS from BS 104 and MS 128 is the nearest MS from BS 104. MS 130 and MS 132 are at same distance from BS 104. Amongst the inner MSs, MS 140 is the farthest MS from BS 104 and MS 134, MS 136 and MS 138 are at the same distance from BS 104. In this example, inner MSs are scheduled from nearest to farthest and outer MS are scheduled from farthest to nearest. This ensures minimum interference experienced by MSs in the native channel and MS in the re-used channels. Here at BS 102, in the inner region, MS 122 and MS 124 are scheduled before MS 120. At BS 104, in the outer region, MS 126 is scheduled first followed by MS 130 and MS 132 (not necessarily in that order) and MS 128 is scheduled last. In the simple scheduling, if BS 102 re-uses the channel f2 to communicate with MS 120 and BS 104 is using its native channel f2 to communicate MS 126 at the same time, they may interfere with each other because of the proximity. However, according to method of scheduling of the invention, MS 120 is scheduled the last by BS 102 and MS 126 is scheduled the first by BS 104. This would minimize the possible interference between MS 120 and MS 126. Similarly, the possible interference between farthest inner MS of BS 104 and the farthest outer MS of BS 102 is also minimized.

Further, the MSs that are at the same distance from a BS may be scheduled in clockwise direction. For example, a clockwise scheduling may be done at BS 104 for MS 134, MS 136, and MS 138. In the present embodiment MS 134, MS 136, and MS 138 are scheduled in that order and MS 140 is scheduled the last.

Figure 7:
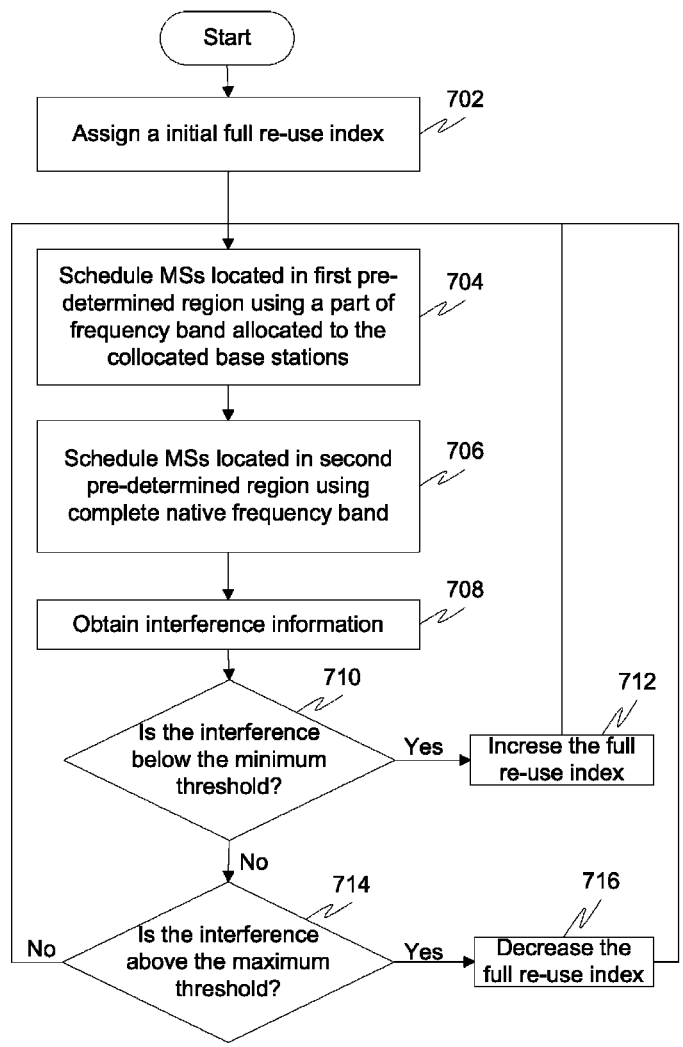
FIG. 7 is a flowchart of a full re-use method for managing communication in a wireless communication network, in accordance with an embodiment of the invention.

FIG. 7 is a flowchart of a full re-use method for managing communication in wireless communication network 100, in accordance with an embodiment of the invention. At step 702, SPC 502 assigns an initial value for a full re-use index to each BS in wireless communication network 100. SPC 502 may reside in central controller 308 Alternatively, SPC 502 may reside in a BS. The initial value may be a random value. The initial value may also be a pre-defined value. At step 704, SPA in each BS schedules MSs located in the first predetermined region of each BS by re-using the native channel of the collocated BSs. MSs located in the first predetermined region are scheduled based on distance and/or orientation with respect to the BS. This has been explained in conjunction with FIG. 6. At step 706, SPA in each BS schedules MSs located in the second predetermined region using the complete native channel of a BS. MSs located in the second predetermined region are scheduled based on distance and/or orientation with respect to the BS. This has been explained in conjunction with FIG. 6. At step 708, interference information is received at the BS. Interference information, for example, may include, but is not limited to the average amount of interference experienced by a MS, bit error ratio, packet error ratio, and capacity. The interference information may be collected by a BS from MSs located in the cell of the BS, in each of the first predetermined region and the second predetermined region. Additionally, the BS communicates the collocated BSs to obtain interference information for MSs located in the collocated cells. At step 710, SPC 502 compares interference information to a predetermined minimum threshold value. If interference is below the predetermined minimum threshold value, then SPC 502 increases the full re-use index at step 712. If SPC 502 resides in central controller 308, then SPC 502 determines the increase in the full re-use index by running an algorithm based on the interference information received from each BS in the service area. Central controller 308 then broadcasts the value of increase in full re-use index to each BS. Each BS in the service area is time synchronized, therefore, the increase in full re-use index in each BS is implemented simultaneously. However, if SPC 502 resides in a BS, each BS obtains interference information from each BS in the service area. SPC 502 residing in each BS then calculate the value of increase in full re-use index based on the interference information received from each BS in the service area by running an algorithm. SPC 502 residing in each BS runs the same algorithm with same input interference information. Therefore, the value of increase in full re-use index computed at each BS in the service area is the same. It will be apparent to a person skilled in the art that any algorithm known in the art may be used to determine the value for increase in full re-use index. Alternatively, the full re-use index may be increased by a predetermined value. Thereafter, step 704 to step 710 are repeated.

However, if interference is above the predetermined minimum threshold value then at step 714, SPC 502 compares the interference to a predetermined maximum threshold value. If interference is above the predetermined maximum threshold value, then SPC 502 decrease the full re-use index at step 716. If SPC 502 resides in central controller 308, then SPC 502 determines the decrease in the full re-use index by running an algorithm based on the interference information received from each BS in the service area. Central controller 308 then broadcasts the value of decrease in full re-use index to each BS. Each BS in the service area is time synchronized; therefore, the decrease in full re-use index in each BS is implemented simultaneously. However, if SPC 502 resides in a BS, each BS obtains interference information from each BS in the service area. SPC 502 residing in each BS then calculates the value of increase in full re-use index based on the interference information received from each BS in the service area by running an algorithm. SPC 502 residing in each BS runs the same algorithm with same input interference information. Therefore, the value of decrease in full re-use index computed at each BS in the service area is the same. It will be apparent to a person skilled in the art that any algorithm known in the art may be used to determine the value for decrease in full re-use index. Alternatively, the full re-use index may be decreased by a predetermined value. Thereafter, step 704 to step 710 are repeated.

Figure 8:
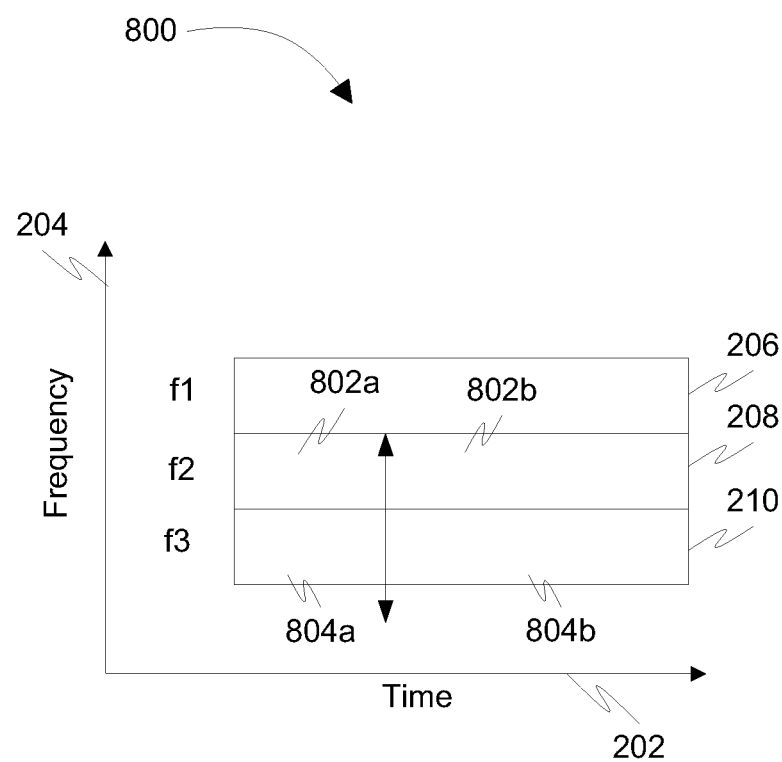
FIG. 8 illustrates a frame structure of a complete channel for a full re-use method, in accordance with an exemplary embodiment of the invention.

FIG. 8 illustrates a frame structure 800 of the complete channel for a full re-use method, in accordance with an exemplary embodiment of the invention. Axis 202 represents the time dimension and axis 204 represents the frequency dimension of frame structure 800. The complete channel of the service area is divided into three segments, i.e., segment 206, segment 208, and segment 210. Segment 206 corresponds to the channel f1, segment 208 corresponds to the channel f2, and segment 210 corresponds to the channel f3. This has been explained in conjunction with FIG. 2. In this illustration, the channel f1 is the native channel of BS 102. In the full re-use method, the channel f1 is completely used to schedule MSs located in the second predetermined region in cell 108. As shown, a fraction 802a of the channel f2 and a fraction 804a of the channel f3 are not re-used. Further, a fraction 802b of the channel f2 and a fraction 804b of the channel f3 are used to schedule MSs located in the first predetermined region in cell 108. The part of the channel f2 and the channel f3 that are not re-used correspond to the full re-use index. For example, if the full re-use index is 10 then fraction 802a is 10% of the channel f2 and fraction 804a is 10% of the channel f3. As the full re-use index is increased, less interference is created in the cell coverage. However, additional bandwidth due frequency re-used becomes less. Therefore this parameter will demonstrate a smooth tradeoff between increase in the bandwidth and decrease in the channel quality seen by an individual subscriber.

Figure 9:
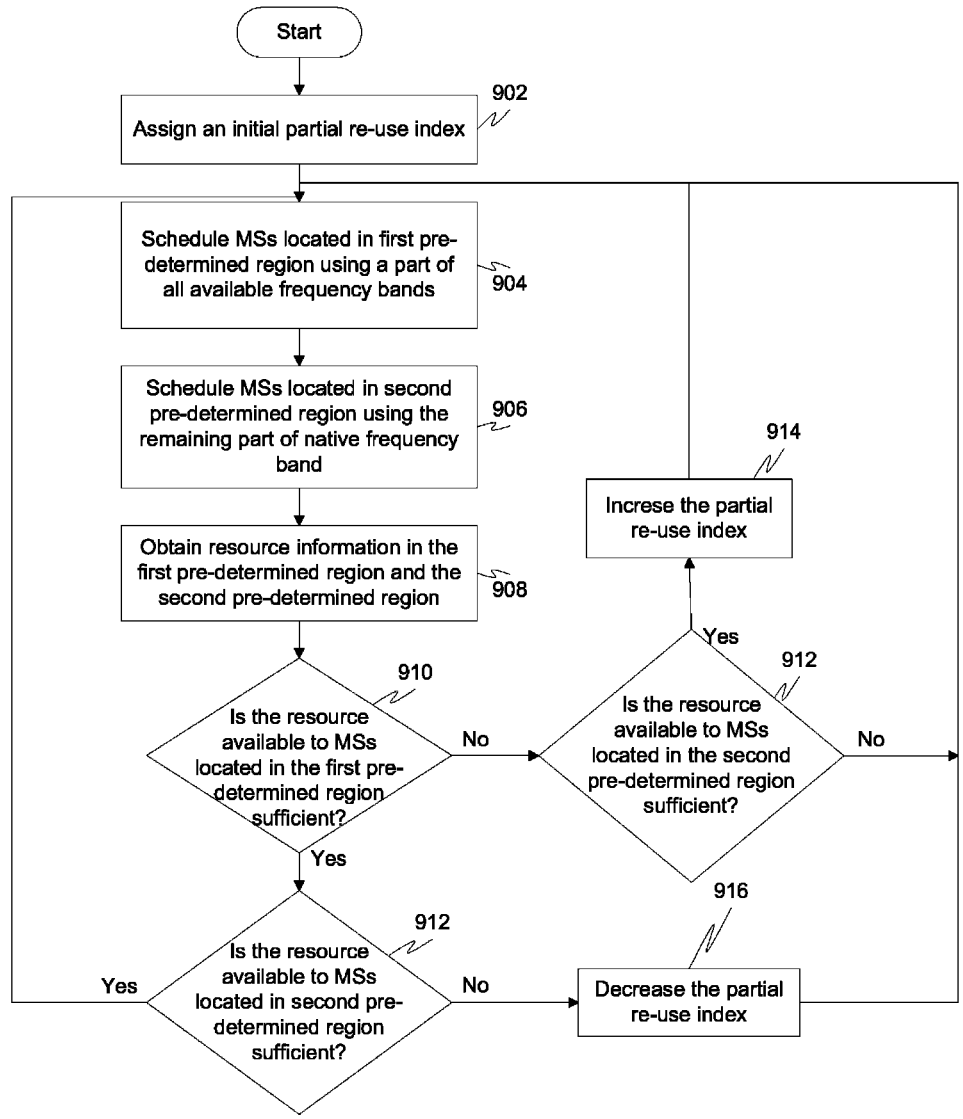
FIG. 9 is a flowchart of a partial re-use method for managing communication in a wireless communication network, in accordance with an embodiment of the invention.

FIG. 9 is a flowchart of a partial re-use method for managing communication in wireless communication network 100, in accordance with an embodiment of the invention. At step 902, SPC 502 assigns an initial value for a partial re-use index to each BS in wireless communication network 100. The initial value may be a pre-defined value. SPC 502 may reside in central controller 308. Alternatively, SPC 502 may reside in a BS. At step 904, SPA in MSs located in the first predetermined region of a BS schedules the MSs using one or more parts of each channel available in the service area. MSs located in the first predetermined region are scheduled based on distance and/or orientation with respect to the BS. This has been explained in conjunction with FIG. 6. At step 906, SPA in MSs located in the second predetermined region schedule the MSs using remaining part of the native channel of the BS. MSs located in the second predetermined region are scheduled based on distance and/or orientation with respect to the BS. This has been explained in conjunction with FIG. 6. At step 908, information relating to resource availability is obtained. Resource availability information, for example, may include, but is not limited to the number of MS that a channel can support. Resource availability information may be collected by the BS from each collocated BS. At step 910, SPC 502 compares the resource availability information of MSs located in the first predetermined region to a predetermined threshold value to determine if the resource available is sufficient to schedule each MSs located in the first predetermined region of the cell of the BS. If resource availability to MSs located in the first predetermined region is not sufficient, at step 914, SPC 502 compares resource availability information of MSs located in the second predetermined region to a predetermined threshold value to determine if the resource available is sufficient to schedule each MS located in the second predetermined region of the cell of the BS. If resource availability to MSs located in the second predetermined region is sufficient, SPC 502 increases the partial re-use index is increased at step 912. If SPC 502 resides in central controller 308, then SPC 502 determines the increase in the partial re-use index by running an algorithm based on the resource availability information received from each BS in the service area. Central controller 308 then broadcasts the value of increase in partial re-use index to each BS. Each BS in the service area is time synchronized, therefore, the increase in partial re-use index in each BS is implemented simultaneously. However, if SPC 502 resides in a BS, each BS obtains resource availability information from each BS in the service area. SPC 502 residing in each BS then calculates the value of increase in partial re-use index based on the resource availability information received from each BS in the service area by running an algorithm. SPC 502 residing in each BS runs the same algorithm with same input resource availability information. Therefore, the value of increase in partial re-use index computed at each BS in the service area is the same. It will be apparent to a person skilled in the art that any algorithm known in the art may be used to determine the value for increase in partial re-use index. Alternatively, the partial re-use index may be increased by a pre-determined value. Thereafter, step 904 to step 910 are repeated. If resource available to MSs located in the second predetermined region is not sufficient, step 904 to step 910 are repeated.

Referring back to step 910, if resource availability to MSs located in the first predetermined region is sufficient, then at step 914, SPC 502 compares resource availability information of MSs located in the second predetermined region to a predetermined threshold value to determine if the resource available is sufficient to schedule each MS located in the second predetermined region of the cell of the BS. If resource availability to MSs located in the second predetermined region is not sufficient, then SPC 502 decreases the partial re-use index at step 916. If SPC 502 resides in central controller 308, then SPC 502 determines the decrease in the partial re-use index by running an algorithm based on the resource availability information received from each BS in the service area. Central controller 308 then broadcasts the value of decrease in partial re-use index to each BS. Each BS in the service area is time synchronized, therefore, the decrease in partial re-use index in each BS is implemented simultaneously. However, if SPC 502 resides in a BS, each BS obtains resource availability information from each BS in the service area. SPC 502 residing in each BS then calculates the value of decrease in partial re-use index based on the resource availability information received from each BS in the service area by running an algorithm. SPC 502 residing in each BS runs the same algorithm with same input resource availability information. Therefore, the value of decrease in partial re-use index computed at each BS in the service area is the same. It will be apparent to a person skilled in the art that any algorithm known in the art may be used to determine the value for decrease in partial re-use index. Alternatively, the partial re-use index may be decreased by a pre-determined value. Thereafter, step 904 to step 910 are repeated. Using the partial re-use method to schedule MS in the cell of the BS ensures that, MSs located in the collocated cells do not experience any interference due to the re-use of channels.

Figure 10:
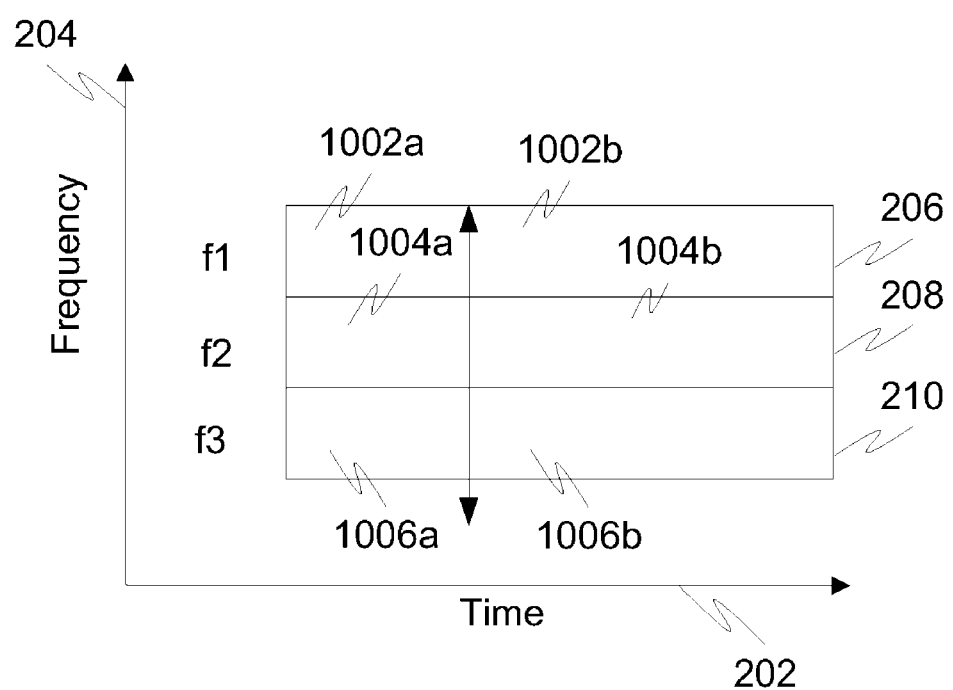
FIG. 10 illustrates a frame structure of a complete channel for a partial re-use method, in accordance with an exemplary embodiment of the invention.

FIG. 10 illustrates a frame structure 1000 of the complete channel for a partial re-use method, in accordance with an exemplary embodiment of the invention. Frame structure 1000 is illustrated on the Channel-time graph. Axis 202 represents the time dimension and axis 204 represents the frequency dimension of frame structure 600. The complete channel of the service area is divided into three segments, i.e., segment 206, segment 208, and segment 210. Segment 206 corresponds to the channel f1, segment 208 corresponds to the channel f2, and segment 210 corresponds to the channel f3. In this illustration, the channel f1 is the native channel of BS 102. In the partial re-use method a fraction 1002a of the channel f1 is used to schedule MSs located in the first predetermined region in cell 108 and a fraction 1002b of the channel f1 is used to schedule MSs located in the second predetermined region in cell 108 of the BS. As shown, a fraction 1004a of the channel f2 and a fraction 1006a of the channel f3 are used to schedule MSs located in the first predetermined region of cell 108. A fraction 1004b of the channel f2 and a fraction 1006b of the channel f3 are not being re-used. The partial re-use index is the percentage of the native frequency channel, e.g. the partial re-use index corresponds to fraction 1002a and is represented as a percentage of the channel f1. Also, the partial re-use index is also applied to other channels in the service area. For example, if the partial re-use index is 10 then fraction 1002a is 10% of the channel f1, fraction 1004a is 10% of the channel f2, and fraction 1006a is 10% of the channel f3. Those skilled in the art will appreciate that this is a strategy between full re-use method and no re-use method such that the second predetermined region flows are not facing any interference and only the flows scheduled in the first predetermined region can interfere with each other.

Figure 11:
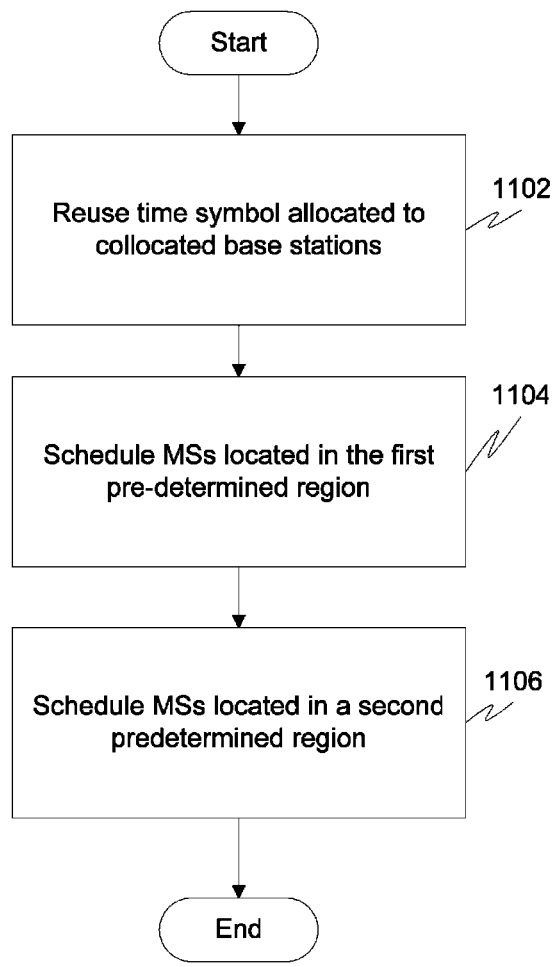
FIG. 11 is a flowchart of a method for managing communication in wireless communication network, in accordance with another embodiment of the invention.

FIG. 11 is a flowchart of a method for managing communication in wireless communication network 100, in accordance with another embodiment of the invention. At step 1102, a BS re-uses time symbols allocated to collocated BSs to communicate with MSs located in a first predetermined region in a cell of the BS. To avoid interference, one or more channels corresponding to a time symbol allocated to collocated BSs may not be re-used. The number of channels whose time symbol allocated to collocated BSs is not re-used may depend on interference information. The number of channels whose time symbol allocated to collocated BSs is not re-used may also depend on resource availability. The first predetermined region may be an inner region of the cell of the BS. The inner region may be an inner cell having a radius which is a fraction of the radius of the cell of the BS. For example, BS 102, re-uses the time symbol T2 and the time symbol T3 to communicate with MSs located inside inner cell 302.

At step 1104, MSs located in the first predetermined region are scheduled based on the position of each MS relative to the BS in the first predetermined region. The MSs located in the first predetermined region are scheduled using one or more of time symbols allocated to the collocated BSs and a native time symbol of the BS.

At step 1106, MSs located in a second predetermined region are scheduled based on the position of each MS relative to the BS. The second predetermined region may be an outer region. The MSs located in the second predetermined region are scheduled using the native time symbol of the BS. MSs located in the second predetermined region are scheduled based on the distance of each MS from corresponding BS.

Various embodiments of the invention provide methods and system for managing communication in a wireless communication network. In this method, channels allocated to collocated BSs are used at a BS, thereby increasing the number of MS s served in the cell of each BS. Therefore, the bandwidth to each BS is increased. Moreover, MSs in a cell of a BS are scheduled based on the position of the cell from the BS, thereby minimizing the interference experienced by MSs in the collocated cell due to the re-use of channels. Further, this system has a re-use factor of 1.

Those skilled in the art will realize that the above recognized advantages and other advantages described herein are merely exemplary and are not meant to be a complete rendering of all of the advantages of the various embodiments of the invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. In a wireless communication network having a plurality of Base Stations (BS), each BS providing communication to at least one Mobile Station (MS) in an associated cell, a method of managing communication in the wireless communication network, the method comprising:

re-using, at a BS, a BS channel allocated to collocated BSs to communicate with MSs located in a first predetermined region in a cell of the BS;

scheduling MSs located in the first predetermined region based on the position of each MS relative to the BS, the MSs located in the first predetermined region being scheduled using at least one of the BS channel allocated to the collocated BSs and a native channel of the BS; and scheduling MSs located in a second predetermined region based on the position of each MS relative to the BS, the MSs located in the second predetermined region being scheduled using the native channel of the BS.

2. The method of claim 1 further comprising partitioning a channel spectrum into a plurality of segments, each segment corresponding to a channel allocated to a BS.

3. The method of claim 1, wherein reusing the BS channel includes leaving at least a part of the channel allocated to collocated BSs unused.

4. The method of claim 2, wherein a part of the channel allocated to the collocated BSs is left unused based on an interference information.

5. The method of claim 2, wherein a part of the channel allocated to the collocated BSs is left unused based on resource availability information.

6. The method of claim 1, wherein the MSs located in the first predetermined region are scheduled using a part of the native channel.

7. The method of claim 1, wherein the MSs located in the first predetermined region and the MSs located in the second predetermined regions are scheduled based on the distance of each MS from the BS.

8. The method of claim 7, wherein the nearest MS located in the first predetermined region is scheduled first and the farthest MS located in the first predetermined region is scheduled last.

9. The method of claim 7, wherein the farthest MS located in the first predetermined region is scheduled first and the nearest MS located in the first predetermined region is scheduled last.

10. The method of claim 7, wherein the nearest MS located in the second predetermined region is scheduled first and the farthest MS located in the second predetermined region is scheduled.

11. The method of claim 7, wherein the nearest MS located in the second predetermined region is scheduled last and the farthest MS located in the second predetermined region is scheduled.

12. The method of claim 1, wherein the MSs located in the first predetermined region and the MSs located in the second predetermined region are scheduled based on orientation of each MS relative to the BS.

13. The method of claim 12, wherein the MSs located in the first predetermined region are scheduled in a clockwise direction.

14. The method of claim 12, wherein the MSs located in the first predetermined region are scheduled in a counter clockwise direction.

15. The method of claim 12, wherein the MSs located in the second predetermined region are scheduled in a clockwise direction.

16. The method of claim 12, wherein the MSs located in the second predetermined region are scheduled in a counter clockwise direction.

17. In a wireless communication network having a plurality of Base Stations (BS), each BS providing communication to at least one Mobile Station (MS) in an associated cell, a method of managing communication in the wireless communication network, the method comprising:

re-using, at a BS, a BS time symbol allocated to collocated BSs to communicate with MSs located in a first predetermined region in a cell of the BS;

scheduling MSs located in the first predetermined region based on the position of each MS relative to the BS, the MSs in the first predetermined region being scheduled using at least one of the BS time symbol allocated to the collocated BSs and a native time symbol of the BS; and scheduling MSs located in a second predetermined region based on the position of each MS relative to the BS, the MSs in the second predetermined region being scheduled using the native time symbol of the BS.

18. The method of claim 17, wherein re-using the BS channel includes leaving at least one channel corresponding to the time symbol allocated to the collocated BSs unused.

19. The method of claim 18, wherein a channel corresponding to the time symbol allocated to the collocated BSs is left unused based on interference information.

20. The method of claim 18, wherein a channel corresponding to the time symbol allocated to the collocated BSs is left unused based on resource availability.

21. A Base Station (BS) in a wireless communication network, the BS comprising:

a controller configured to re-use at the BS at least one BS channel allocated to collocated BSs in a first predetermined region in a cell of the BS;

a transceiver processor configured to:

measure the position of a plurality of Mobile Stations (MSs) associated with the BS from the BS in the first predetermined region and a second predetermined region of the cell; and schedule the plurality of MSs based on the position of each MS from the BS in the first predetermined region and the second predetermined region.

22. The BS of claim 21, wherein the controller is further configured to define a threshold for the first predetermined region.

23. The BS of claim 21, wherein the transceiver processor is further configured to distinguish MSs located in the first predetermined region from MSs located in the second predetermined region.

24. In a wireless communication network having a plurality of Base Stations (BSs), each BS providing communication to at least one Mobile Station (MS) in an associated cell, a system for managing communication in the wireless communication network, the system comprising:

a Spectrum Controller (SPC) for forming a frame structure for a set of BSs, the set of BSs being a fraction of the plurality of BSs, each BS in the set of BSs being configured to use the frame structure to communicate with the at least one MS located in the associated cell; and a set of Spectrum Agent (SPAs) operatively coupled with the SPC, each SPA being configured to schedule the at least one MS located in the associated cell of each BS in the set of BSs, the at least one MS located in the associated cell being scheduled based on the position of the MS from the corresponding BS in the associated cell.

25. The system of claim 24, wherein the SPC is located in a BS of the set of BSs.

26. The system of claim 24, wherein a SPA is located in a BS of the set of BSs.

27. The system of claim 24, wherein the SPC is located in an access gateway of the wireless communication network.

28. The system of claim 27, wherein the access gateway is an Access Service Network Gateway (ASN-GW) of the wireless communication network.

29. The system of claim 24, wherein the SPA scheduled the MS located in the cell of the BS based on the distance of the MS from the BS in the cell.

30. The system of claim 24, wherein the SPA scheduled the MS located in the cell of the BS based on the orientation of the MS from the BS in the cell.

* * * * *